March 8, 1966  W. E. MILLER  3,238,724
CONTROL FOR HYDROSTATIC TRANSMISSIONS
Filed Jan. 7, 1965  3 Sheets-Sheet 1
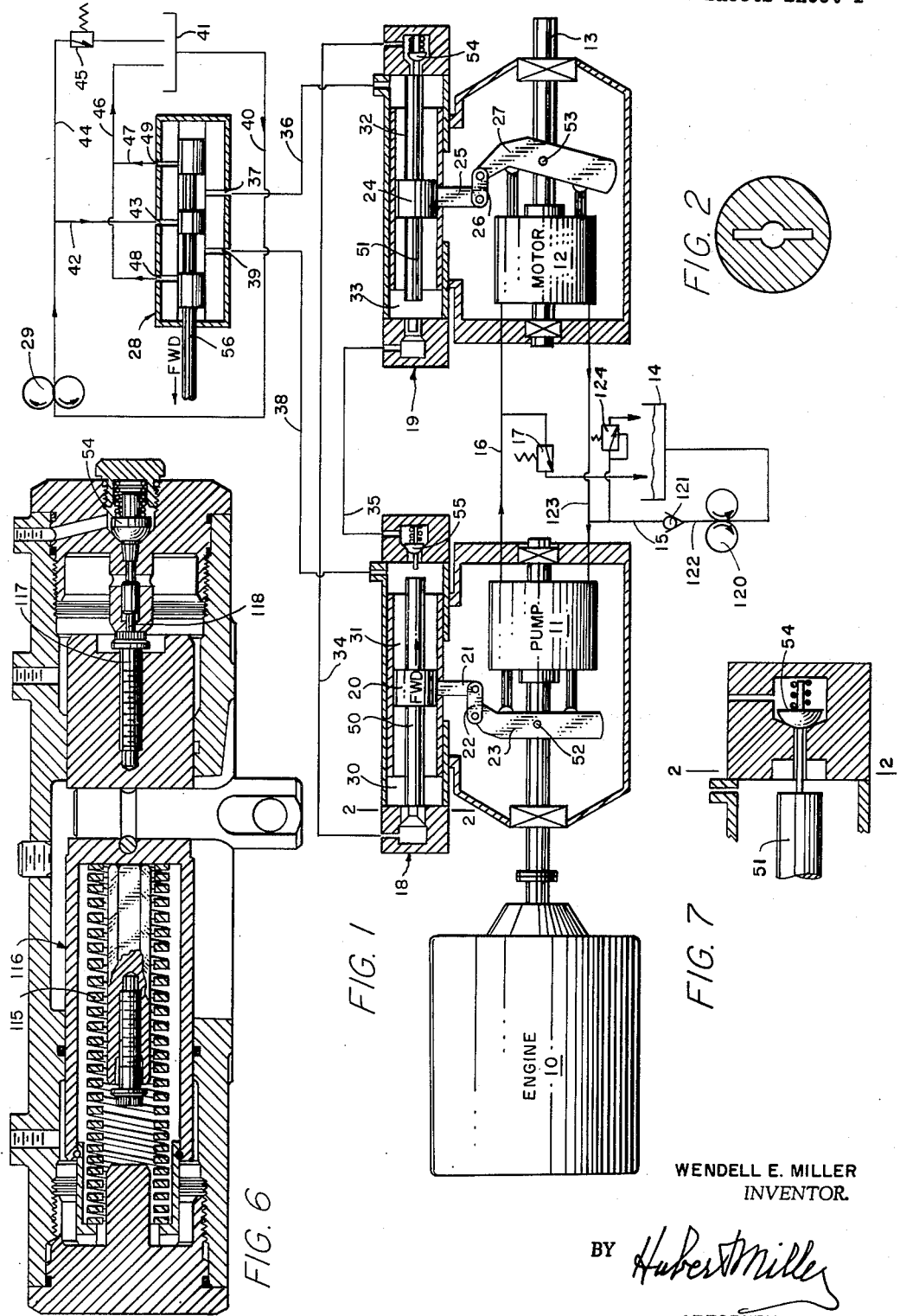
WENDELL E. MILLER
INVENTOR.
BY *Hubert Miller*
ATTORNEY

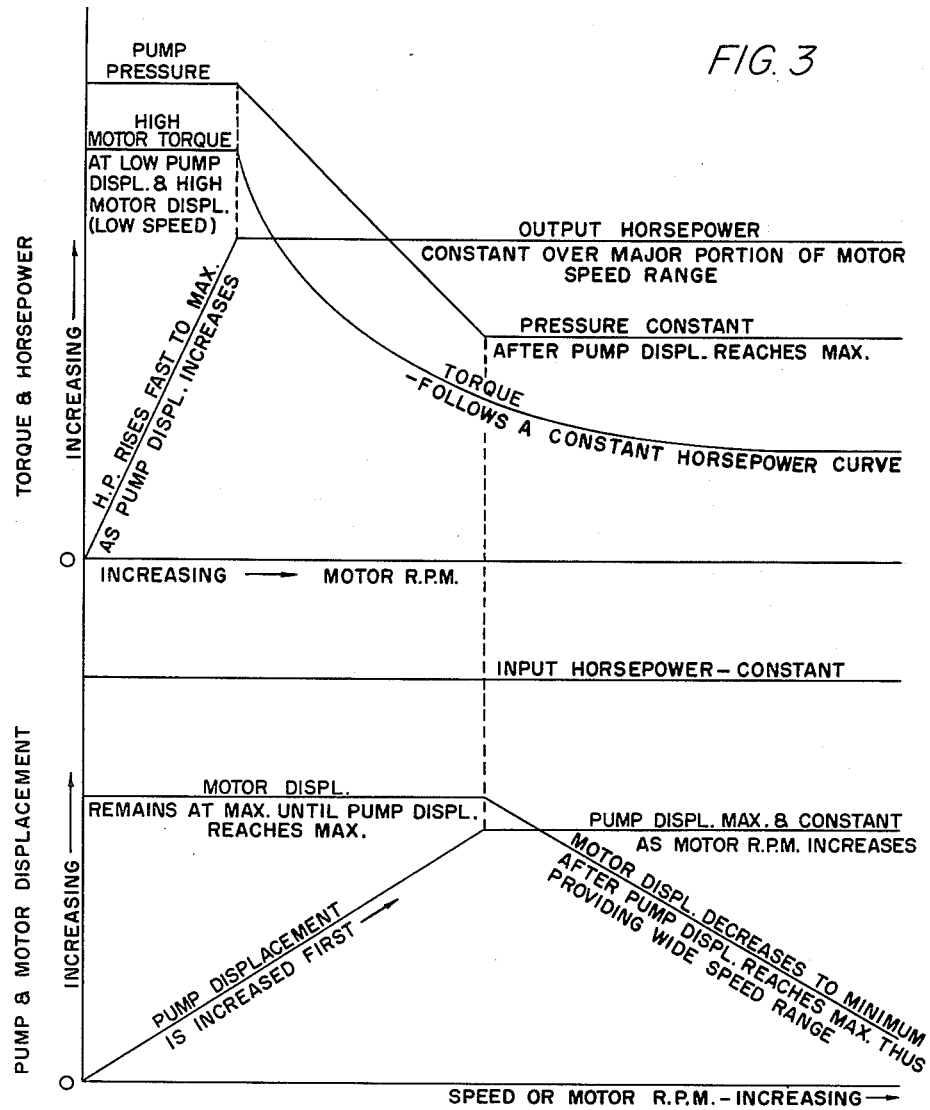

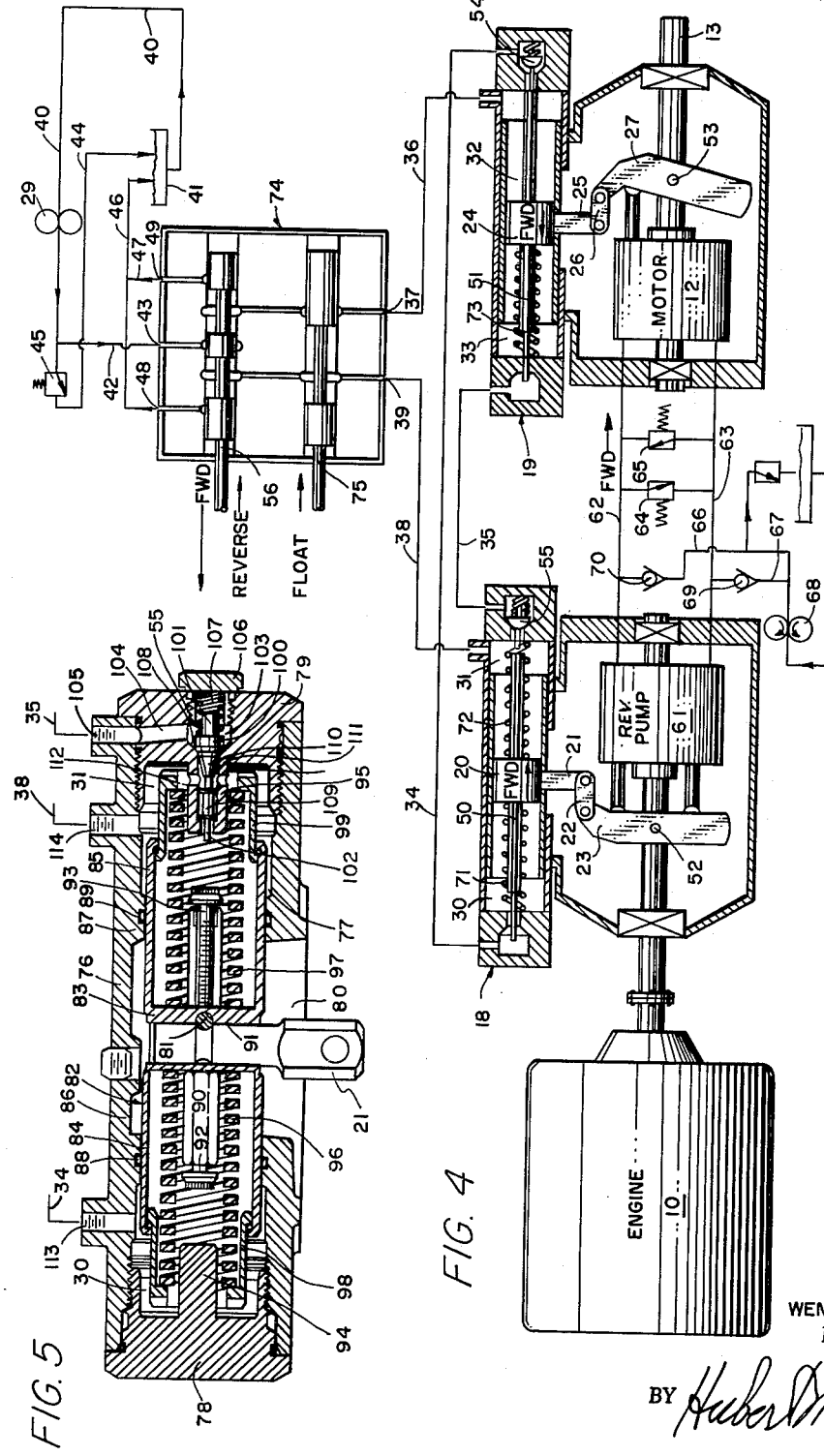

United States Patent Office 3,238,724
Patented Mar. 8, 1966

3,238,724
CONTROL FOR HYDROSTATIC TRANSMISSIONS
Wendell E. Miller, Hutchinson, Kans., assignor to The Cessna Aircraft Company, Wichita, Kans., a corporation of Kansas
Filed Jan. 7, 1965, Ser. No. 423,937
13 Claims. (Cl. 60—53)

This invention relates generally to hydrostatic drives or hydraulic power transmission systems, and more particularly to a method and means for sequentially controlling the respective displacements of the driven variable displacement fluid pump and the variable displacement fluid motor which together constitute a hydrostatic drive or system for transmitting power from a prime mover to any mechanism to be driven. Such hydrostatic transmission systems may be used in driving the traction elements of a tractor, truck, agricultural machine, locomotive or the like, or in driving electrical generators, lathes, and other machinery.

While many special purpose hydrostatic transmissions may utilize the combination of a variable displacement pump and a constant displacement motor, or vice versa, in driving a heavy vehicle or any mechanism which requires high starting torque plus a reasonably wide speed range, it is highly advantageous to utilize a transmission in which the displacements of *both* the pump and motor are variable, because a much greater speed range can be provided for the motor output shaft.

In such applications of use it is also highly advantageous to locate the pump and motor, or motors in locations relatively remote from each other, and often remote from the operator or control unit. The remote location of the various units highly complicates the means or mechanism for smoothly controlling and coordinating the respective changes in displacement of the pump and the motor, or motors.

It is a primary object of this invention to provide improved means for smoothly controlling and coordinating changes in the respective displacements of the pump and motor, or motors, of a hydrostatic transmission system in which a variable displacement pump, a variable displacement motor, or motors, and an operator's control valve are all located remote from each other, and in which the precision of control is unaffected by the remote locations of the various units. An efficient displacement control system for both the pump and motor which allows these components to be located remote from each other as well as from the control operator is highly advantageous, primarily because it eliminates the need for providing a gear train or other mechanism for transmitting motion from the hydraulic motor to the drive wheels of a vehicle, or from the vehicle power plant to a remotely located pump. It allows the driving motors to be located at the driving wheels, and the pump to be located on the chassis to be driven directly from the power plant.

It is an additional important object to provide a method of control for such a hydrostatic transmission system which coordinates the changes in displacement of the pump and motor or motors in such a manner as to provide a wide speed range for the power output shaft of the motor, high torque at relatively low motor shaft speeds, and constant horsepower at higher and maximum motor shaft speeds.

The last above-named object is accomplished by sequentially first changing the displacement of the pump from zero or low displacement to maximum, and subsequently decreasing the displacement of the motor or motors from maximum or high displacement to a predetermined minimum or optimum operational displacement.

An additional important object of this invention is to provide a control means for the type of hydrostatic transmission specified above which is capable of positively controlling both the acceleration and deceleration of the motor output shaft without changing the rotational speed of the engine which drives the pump.

Still another object is to provide a control for the type of hydrostatic transmission specified above which does not require by-passing of pump output fluid in order to operate the motor output shaft at low speeds or to effect changes in the rotational speed of the motor output shaft, but which utilizes the full volume of fluid delivered by the pump at whatever speed the pump drive shaft may be driven by the power plant.

My invention will be more clearly understood when the following description is read in connection with the accompanying drawings, in which:

FIG. 1 is a schematic view of a hydrostatic transmission system which embodies my invention in one form, certain components being shown in central longitudinal section;

FIG. 2 is a transverse sectional view through one of the displacement control cylinders which constitutes a part of my invention, and is taken along the line 2—2 of FIG. 7;

FIG. 3 is a compound graph based on data obtained by tests of my control system and method, and clearly illustrates the results produced by my method of sequentially increasing the pump displacement and then decreasing the motor displacement in a hydrostatic transmission system;

FIG. 4 is a schematic view of a hydrostatic transmission system which embodies my invention in a second form, certain components in this view also being shown in central longitudinal section;

FIG. 5 is a central longitudinal sectional view through a hydraulic control cylinder or servo unit for controlling the displacement of a variable displacement reversible flow hydraulic pump, and illustrates details in the construction thereof;

FIG. 6 is a view similar to FIG. 5, and illustrates details in the construction of a control cylinder or servo unit for controlling the displacement of a variable displacement hydraulic motor; and FIG. 7 is a fragmentary section view through an end of one of the displacement varying cylinders shown schematically in FIGS. 1 and 4, and shows details in construction which afford fluid flow through the valve even when the end of the piston rod is seated against the end of the cylinder.

DESCRIPTION.—FIG. 1 SYSTEM

The hydrostatic transmission system illustrated in FIG. 1 includes: a power unit 10 coupled to drive the shaft of a positive and variable displacement, uni-directional flow multi-piston type hydraulic pump 11; a positive and variable displacement multi-piston type hydraulic motor 12, having a power output or drive shaft 13; a system reservoir 14; a conduit 15 connecting the pump intake to reservoir 14; a conduit 16 connecting the pump discharge port with the motor intake port; a system relief valve 17 in communication with conduit 16 and with the reservoir 14; a system charging pump 120; a charging check valve 121 interposed in a conduit 122 which connects pump discharge with a conduit 123 connecting the motor discharge port with the intake port of pump 11; a charging pump relief valve 124; two cooperating interconnected hydraulically actuated displacement control cylinder or servo units, designated as a whole by the numerals 18 and 19, one (18) being mounted on the pump housing and having its piston 20 connected by linkage 21–22 to a displacement varying cam plate 23 on the pump, the other control cylinder 19 being similarly mounted on the motor housing and having its piston 24 connected by linkage 25–26 to a displacement varying cam plate 27 on the motor 12; a conventional spool type 3-way fluid flow control valve 28; and an auxiliary source of fluid under pressure 29 for selectively delivering fluid through the valve to either of the cylinders 18 or 19.

Piston 20 divides cylinder 18 into a working chamber 30 and a fluid return chamber 31, while piston 24 divides cylinder 19 into a working chamber 32, and what will be termed herein a fluid lock chamber 33.

A first conduit 34 connects the working chamber 32 of the motor control cylinder 19 with the working chamber 30 of the pump control cylinder 18. A second conduit 35 connects the fluid lock chamber 33 of the motor control cylinder 19 with the return chamber 31 of the pump control cylinder 18. A conduit 36 connects one motor port 37 of the valve 28 with working chamber 32 of motor control cylinder 19, and a conduit 38 connects the other motor port 39 with return chamber 31 of the pump control cylinder 18.

The hydraulic circuit for the two displacement control cylinders includes a conduit 40 which connects a system reservoir 41 with the intake of pump 29, a conduit 42 which connects the pump discharge with the inlet 43 of valve 28, a conduit 44 which connects the pump discharge with reservoir 41 through a system relief valve 45, and conduits 46 and 47 which connect the two return ports 48 and 49 of valve 28 to the reservoir 41.

In both the displacement control cylinders 18 and 19 the opposite ends of the respective piston rods 50 and 51 contact the adjacent opposite ends of the respective cylinders, and thus serve as a means of limiting the travel of the respective pistons in both directions.

The location of piston 20 on its rod 50 is such, and the linkage between piston 20 and cam plate 23 is such, that when piston 20 is at the left end of its permitted path of travel, as it is shown in FIG. 1, cam plate 23 is in a position to provide zero pump displacement. These positions of piston 20 and cam plate 23 are considered their neutral positions. When piston 20 and its rod moves to the right hand end of its permitted path of travel the linkage 21–22 moves cam plate 23 about its pivot pin 52 to a position providing maximum pump displacement.

Conversely, when motor control cylinder piston 24 is in its neutral position at the right hand end of its permitted path of travel, as shown in FIG. 1, the motor cam plate is moved about its pivot pin 53 to a position providing maximum motor displacement. When motor control piston 24 moves to the left hand end of its permitted path of travel, the motor cam plate is moved to a position providing a desired and predetermined minimum operating displacement for the motor.

In FIG. 1 it will be observed that a spring pressed poppet valve 54 is interposed in the fluid path connecting motor control cylinder working chamber 32 and working chamber 30 of the pump control cylinder. Poppet valve 54 is shown mounted in the end of motor control cylinder 19 so that its stem will be contacted and the valve forcibly opened by piston rod 51 as piston 24 moves into its neutral position. The location of the valve is optional. It may be interposed at any point in conduit 34 so long as means are provided to open the valve as the motor cam plate moves to its neutral or maximum displacement position. It is shown mounted in the end of the motor control cylinder for ease in illustrating the invention. Other types of valves may of course be used so long as their opening and closing is coordinated with changes in the displacement angle of the displacement varying cam plate.

Similarly, a spring seated poppet valve 55 is mounted in the right end of pump control cylinder 18 in a position to be contacted and forcibly opened as the piston 20 moves to tilt the pump cam plate 23 to a position of maximum pump displacement. The flow ports through both ends of both control cylinders are laterally slotted, as clearly shown in FIG. 2 to prevent the ports from being closed by the respective opposite ends of the piston rods 50 and 51 when they contact the adjacent ends of their respective cylinders.

OPERATION.—FIG. 1 SYSTEM

With all conduits and cylinder chambers in the control circuit filled with hydraulic fluid, and with the control pistons 20 and 24 in their respective neutral positions, as shown in FIG. 1, the operator moves control valve spool 56 to the left. Pressure fluid flows from the source 29, through control valve 28, and conduit 36 into motor cylinder working chamber 32. Pump control cylinder poppet valve 55 is at this time seated, and the fluid in lock chamber 33 and conduit 35 provides a fluid lock against movement of piston 24 to the left. Fluid entering chamber 32 passes through poppet valve 54 and conduit 34 into pump control cylinder working chamber 30, and forces piston 20 to start moving to the right. This piston movement continuously changes the angle of pump cam plate 23, and thus increases pump displacement. Fluid displaced from return chamber 31 flows through conduit 38, through valve 28, port 48 and conduit 46 to reservoir 41. The increase in displacement of main pump 11 can be arrested by return of valve spool 56 to its neutral position. If arrested with the pump cam plate providing low displacement, then the rotational speed of the motor output shaft 13 will continue relatively low. Since valve spool 56 in its neutral position blocks fluid flow to and from both control cylinders, the control cylinder pistons will remain in the respective positions which they occupy at the time the valve spool 56 is moved to neutral position, and the motor output shaft will continue rotating at a steady speed.

If the valve spool 56 is allowed to remain at the left end of its neutral position, pump displacement continues to increase to maximum, and simultaneously piston rod 50 opens poppet valve 55. At this time no addiitonal fluid can flow through conduit 34 into pump cylinder working chamber 30 because pump cylinder piston 20 is blocked from further movement by its rod 50 being in contact with the right end of the cylinder 18. Consequently pressure in motor cylinder working chamber 32 rises.

The opening of poppet 55 frees fluid to flow from the fluid lock chamber 33 of the motor control cylinder through conduit 35, poppet 5, and conduits 38 and 46 to the reservoir. Motor control cylinder piston 24, no longer being locked against movement by fluid in chamber 33, moves to the left, moving motor cam plate to its predetermined minimum displacement position.

With the pump control cylinder piston 20 and the connected pump cam plate 23 in positions to provide maximum pump displacement, and with the motor control cylinder piston 24 and its connected motor cam plate 27 in positions to provide minimum permitted motor displacement, the rotational speed of the motor output shaft is maximum.

Should it be desired to slow the speed of the motor shaft, it is only necessary to move the valve control spool 56 to the right of its neutral position. Such movement directs pressure fluid through conduit 38 into pump control cylinder return chamber 31. Poppet 55 is at this time being held open by piston rod 50. Pump control piston 20 is at this time locked against movement toward its neutral position because fluid in chamber 30 and conduit 34 cannot force its way past poppet 54, which is closed.

Fluid entering pump return chamber 31 therefore flows through poppet 55 and conduit 35 into motor cylinder lock chamber 33 and forces piston 24 to its neutral position, motor cam plate 27 being simultaneously moved to again provide maximum pump displacement. This provides considerable slowing of the motor drive shaft, and the decrease in shaft speed can be arrested by returning valve spool 56 to neutral position when the desired motor shaft speed has been reached. If the motor is serving to drive a vehicle drive wheel, it provides a positive braking action on the drive wheel, because both the pump and the motor are of the positive displacement type.

If further slowing or stopping of the motor shaft is desired the valve spool 56 is allowed to remain to the right of its neutral position.

After motor control piston 24 is stopped in its neutral position, further flow into lock chamber 33 is blocked. Simultaneously poppet 54 is opened by piston rod 51, thus freeing fluid in pump cylinder working chamber 30 to flow through conduit 34, poppet 54, chamber 32, conduit 36, control valve 28, and conduits 47 and 46 to reservoir. Pump displacement control piston 20 is then forced to the left into its neutral position moving pump cam plate 23 to its zero displacement position, and motor shaft 13 ceases to rotate.

Should engine 10 cease to operate at the time either or both of the displacement control pistons are away from the neutral positions shown in FIG. 1, it is only necessary for the operator to move control valve spool 56 to the right end of the valve housing and both pistons 20 and 24 will be returned to their respective neutral positions. Thus it will not be necessary to restart engine 10 while the pump is displacing fluid.

To incorporate this control system into hydrostatic drive for a vehicle it is only necessary to provide two identical capacity motors, such as motor 12, one for each drive wheel, and positive mechanical linkage between the two displacement varying cam plates of the respective motors. In this manner a single motor displacement control cylinder 19 will serve to change the cam plate angles of the respective motors simultaneously and to an identical displacement capacity, both motors being provided motive fluid from a single pump of a desired capacity. Such is believed to be within the skill of an ordinary mechanic. No change would be required in the above described system and method of controlling the hydrostatic drive.

The graph, with legends, which constitutes accompanying drawing FIG. 3, is believed to clearly illustrate the results produced by my method of controlling a hydrostatic drive by sequentially first changing the displacement of the pump from zero to maximum, and then changing the displacement of the motor or motors from maximum to an optimum minimum displacement, as described above. The data on which the curves are based was obtained by actual test of a hydrostatic drive for a vehicle controlled by the above described control system and method.

In FIG. 3 it will be seen that when motor displacement is at maximum and pump displacement is low, the motor shaft speed is low, pump pressure is high, motor torque is high, and output horsepower reaches maximum while pump displacement is still in a lower intermediate range.

As pump displacement increases to maximum, while motor displacement remains at maximum, both the pump pressure and output shaft torque drop rather fast; but after pump displacement has reached maximum, and motor displacement begins to decrease, the output torque drops very little, and output horsepower remains constant.

The hydrostatic drive in the vehicle tested, embodying my sequential control of the pump and motor displacements, provided a vehicle speed range of zero to 25 m.p.h. without any gear ratio change, or other variable speed mechanisms. Acceleration and deceleration can be precisely controlled through the spool type control valve. This speed range can be increased, of course, by substituting a pump having larger output capacity. However, my control system and method provides a much greater speed range than conventional control systems when both systems are used to control a pump and motor combination of the same capacity. Conversely an engine-pump-motor combination of smaller capacity, controlled by my system will provide a speed range equivalent to the speed range provided by an engine-pump-motor combination of greater capacity, when controlled by conventional systems.

DESCRIPTION.—FIG. 4 SYSTEM

The system illustrated in FIG. 4 differs only slightly from the previously described system illustrated in FIG. 1.

Like numerals designate like parts and components in all figures.

In the FIG. 4 system the main pump 61 is of the same positive and variable displacement, multiple, reciprocating piston type, but it is also capable of reversing the direction of the fluid flow through the hydrostatic transmission circuit, i.e., when the displacement controlling cam plate 23 is tilted clockwise about its pivot axis 52, pressure fluid is delivered through a conduit 62 to the "forward" inlet of motor 12, and the motor shaft is driven in one direction, used motor driving fluid returning to the pump through a conduit 63; and when cam plate 23 is tilted away from its neutral or zero displacement position in a counter-clockwise direction, pressure fluid is delivered to the motor through conduit 63, returns to the pump through conduit 62, and the motor shaft 13 is driven in an opposite direction of rotation.

In the FIG. 4 system spring pressed pre-set relief valves 64 and 65 are interposed in cross conduits which connect the conduits 62 and 63, which relief valves limit the maximum pressure under which the motor 12 operates, regardless of the direction of flow of fluid to the motor. In addition, conduits 66 and 67 respectively connect conduits 62 and 63 with a suitable source of pump and motor charging fluid under pressure to fill all conduits, chambers, etc. prior to operation of the transmission system. In this instance the charging source is shown as an auxiliary gear pump 68, although the pump 29 of the displacement control cylinder circuit or any other source may be used. Charging check valves 69 and 70 interposed in conduits 66 and 67, respectively, prevent the transmission circuit fluid from backing up into the charging circuit.

As to the cam actuating displacement control cylinders, or servos 18 and 19, they differ from the FIG. 1 cylinders only by the inclusion of centering springs 71 and 72 on opposite ends of piston rod 50 of the pump cylinder, to urge the piston 20 and its cam plate 23 to their respective neutral positions, as shown; and a similarly mounted spring 73 to urge motor cylinder piston 24 and its connected cam plate 27 to their respective neutral positions, as shown.

A modified cylinder circuit control valve 74 differs from the FIG. 1 control valve 28 by the inclusion of an additional "float" spool 75, shown in its neutral position, and which when moved to the right serves to openly connect the conduits 36 and 38, which permits a free flow of fluid through the control circuit and allows the springs 71, 72 and 73 to move the respective pump and motor pistons to their respective neutral positions prior to starting of the power plant 10. Any type of control valve having a "float" position would serve equally well.

OPERATION.—FIG. 4 SYSTEM

This system operates in the same manner as the FIG. 1 system except that if spool 56 is moved to the right of its neutral position, shown, with control cylinder pistons 20 and 24 and their connected cam plates 23 and 27 in their respective neutral positions, source fluid flows through valve ports 43 and 39, and conduit 38 into cylinder chamber 31.

At this time motor cylinder piston rod 51 is against the right hand end of the cylinder 19, poppet valve 54 is being held open, and fluid cannot flow through conduit 35 into chamber 33 because this space is full and piston 24 cannot move farther to the right. Motor cam plate 27 thus remains in its neutral or maximum motor displacement position.

Pressure in pump cylinder chamber 31 thus forces pump cylinder piston to the left of its neutral position and pump cam plate is tilted counterclockwise from its neutral position. Fluid from pump cylinder chamber 30 flows through conduit 34, poppet 54, chamber 32, conduit 36, and through valve 74 and conduits 47 and 46 to reservoir.

As a result of this pump cam plate movement, the pump delivers fluid to motor 12 through conduit 63 instead of through conduit 62, and the direction of rotation of pump shaft 13 is reversed. It should be noted that throughout this reverse rotational movement of shaft 13 the motor cam plate 27 remains in its maximum displacement position. Consequently the speed range of the transmission system, when operated in reverse is relatively low, and the motor torque and horsepower are relatively high, as clearly indicated by the FIG. 3 graph.

To maintain any desired reverse rotational speed it is only necessary to return valve spool 56 to its neutral position. To again stop rotation of shaft 13, spool 56 is moved to the left of its neutral position until fluid flowing through conduit 36, poppet 54, conduit 34 and into pump cylinder chamber 30 returns the piston 20 to its neutral position. Fluid displaced from chamber 31 flows through conduit 38 to the system reservoir 41.

PREFERRED DESIGN DETAILS.—FIG. 5 PUMP DISPLACEMENT CONTROL CYLINDER

A preferred construction for the cylinder 18 shown in FIG. 4 is illustrated in detail in FIG. 5.

The elongated cylinder barrel 76 has its longitudinal bore 77 sealed at each end by plugs 78 and 79, and is provided with a longitudinal slot 80 to afford reciprocating movement for an arm 21, which is secured by a dowel pin 81 to the piston 82, and projects laterally therefrom for pivotal connection to the cam actuating link 22 (FIG. 4).

The piston 82 is provided with a central partition 83 and a pair of integral oppositely extending cylindrical hollow skirts 84 and 85, each of which is open at its outer end. Reduced internal annular barrel portions 86 and 87 carrying suitable seals 88 and 89, respectively, serve to seal against the respective outer wall surfaces of the skirts 84 and 85 as the piston reciprocates, and serve to seal the chambers 30 and 31 at the opposite ends of the cylinder barrel.

Internally threaded elongated sleeves 90 and 91 are carried respectively within springs 96 and 97 with their respective inner ends abutting the opposite surfaces of piston partition 83, and extend longitudinally, centrally, and in opposite directions from such partition. Adjustable stop bolts 92 and 93 are carried respectively by the sleeves 90 and 91, and contact central internal projections 94 and 95 on plugs 78 and 79 to limit the travel of piston 82 in both directions.

Projections 94 and 95 also serve as spring guides for coil springs 96 and 97, which serve to urge piston 82 toward its neutral position, shown. The outer ends of springs 96 and 97 bear respectively against cup-like spring seats 98 and 99, which are mounted for telescopic movement in the respective outer ends of the piston skirts 84 and 85.

The poppet 55 in the FIG. 5 control cylinder includes a head 100, an integral outwardly projecting limit stop and spring guide 101, and an integral inwardly projecting stem 102. Head 100 reciprocates in a chamber 103 formed in plug 79, and chamber 103 communicates by means of a duct 104 with a cylinder port 105.

The outer end of chamber 103 is sealed by a threaded plug 106, and a coil spring 107 bears against plug 106 to urge the valve head onto its seat 108. Valve stem 102 includes a valve movement guiding and bore sealing plunger 109, and a tapered flow metering portion 110, which reciprocate in a longitudinally disposed bore 111 in plug projection 95. Bore 111 communicates with chamber 103 at the valve seat 108, and communicates with chamber 31 by means of a cross bore 112. Cylinder ports 113 and 114 afford fluid flow to and from the respective cylinder chambers 30 and 31. It should be noted that valve stem 102 projects beyond the inner end of projection 95 in a position to be contacted by the head of bolt 93 as the piston 82 approaches the extreme end of its permitted stroke to the right. Valve head 100 is lifted off its seat only a very slight distance by such piston movement, and the tapered surface of metering pin 110 allows only a limited and very gradual increase in fluid flow from chamber 103 into chamber 31 as the valve head is lifted.

FIG. 5.—POPPET VALVE OPERATION

Referring back to the detailed description of the operation of the FIG. 1 system, when the FIG. 4 system includes the above described poppet valve, and is operated in a "forward" direction, as piston 82 moves to the right and pump cam plate 23 approaches maximum displacement position, poppet valve 55 begins to open. Up to this time motor piston 24 has been fluid locked against movement. As fluid begins to flow from motor cylinder lock chamber through poppet 55, motor cylinder piston 24 begins to move very slowly to the left, which results in a very slow decrease in motor displacement.

Simultaneously pump cam plate 23 is approaching and reaches its maximum displacement position, and poppet 55 is opening and gradually increasing the permitted fluid flow from motor cylinder lock chamber 33. This poppet valve thus accomplishes a slight overlapping in the sequence of pump and motor displacement changes, and provides a very smooth coordination of the two. This is the primary purpose of the described poppet valve construction.

FIG. 6.—MOTOR DISPLACEMENT CONTROL CYLINDER

The FIG. 6 cylinder is very similar in construction to the described FIG. 5 cylinder, save that it has only one spring 115 urging its piston 116 into its neutral position, shown, and the piston has permitted movement only to the left of its neutral position.

The poppet valve 54 is identical in construction to the poppet valve described in connection with FIG. 5, operates identically, and serves the same purpose.

After the FIG. 4 system has been operating with the pump displacement at maximum and the motor displacement between maximum and minimum, as the operator begins to slow or stop the system by moving valve spool 56 to the right of its neutral position, pressure fluid travels through conduit 38, chamber 31, poppet 55, conduit 35 into lock chamber 33. Pressure in the latter chamber forces piston 24 to the right decreasing motor displacement. As the limit stop bolt 117 (FIG. 6) contacts poppet valve stem 118 and begins to open the poppet valve a very limited but slowing increasing quantity of fluid begins to flow from pump control cylinder chamber 30, through conduit 34, poppet 54, motor control cylinder chamber 32, and conduit 36 to reservoir. Thus pump cylinder piston 82 is allowed to start moving to the left to start decreasing pump displacement just before the motor cylinder piston 116 (FIG. 5) and its cam plate 27 (FIG. 4) reach their maximum displacement positions. The result is a smooth coordination of sequential pump and motor displacement changes by means of a slight and controlled overlap in the sequences of such changes during both an increase and decrease in the operational speed of the system.

From all the above description it will be seen that my invention provides a method of sequentially controlling pump and motor displacement changes in a hydrostatic transmission system which produces a very wide range of motor shaft speeds, which produces high output horsepower and high output torque at low and intermediate shaft speeds, and which produces constant horsepower and substantially constant output torque between intermediate and maximum shaft speeds. It will also be understood that my invention provides a system and mechanisms for accomplishing the above enumerated results when the main hydraulic pump, the driven hydraulic motor, and the hydraulic valve for controlling the operation of the system are all located remote from each other.

Having described the invention with sufficient clarity to enable those familiar with this art to utilize the method, and to construct and use systems embodying the invention, I claim:

1. In a hydrostatic transmission system:
   a power driven variable displacement fluid pump as a source of motive fluid;
   a variable displacement fluid driven motor;
   means operatively and communicatively connecting the ports of the variable displacement fluid pump and the variable displacement fluid motor for driving the fluid motor;
   servo means operatively connected to the variable displacement fluid pump;
   servo means operatively connected to the variable displacement fluid motor, said servo means being effective, when energized, to vary the fluid output of the fluid displacement pump and the fluid capacity of said fluid motor;
   means communicatively connecting the servo means for the flow of motive fluid serially therethrough;
   and control means responsive to the position of the respective servo means for sequentially varying the fluid displacements of the fluid pump and the fluid motor in a predetermined order.

2. The hydrostatic transmission system described in claim 1 wherein said servo means each includes a piston movable in a cylinder, and wherein said control means includes piston actuated valve members positioned in the path of fluid flow between said servos to control the delivery of motive fluid to said servo cylinders in a predetermined order and in response to the position of the respective pistons within their cylinders.

3. The hydrostatic transmission system described in claim 1 wherein each servo means includes a piston and cylinder device, the pistons dividing the respective cylinders into a piston-working chamber and a piston-locking chamber;
   and piston controlled valve means operatively associated with each servo cylinder for directing motive fluid to said working chambers and to said locking chambers, selectively, in response to the position of the respective pistons therein to effect operation of the pistons successively in a predetermined order.

4. A hydrostatic power transmission system comprising:
   a driven positive and variable displacement fluid pump;
   hydraulically actuated displacement varying means operably associated with said pump;
   a positive and variable displacement fluid driven motor communicatively connected to receive and be driven by the output from said pump;
   hydraulically actuated displacement varying means operably associated with said motor, and in fluid communication with the pump displacement varying means;
   a source of fluid under pressure;
   a control valve interposed between said source of fluid and the two displacement varying means for selectively directing pressure fluid from the source thereto; and
   cooperating hydraulically interconnected fluid flow control means hydraulically connected respectively to the pump and motor displacement varying means and responsive to the respective movements thereof, under the influence of hydraulic pressure from said source, to control the flow of pressure fluid to both displacement varying means in a manner to assure sequential variation of the displacements of the fluid pump and of the fluid motor in a predetermined order.

5. The transmission system described in claim 4 in which fluid flow control includes fluid lock means to block initial operation of the displacement varying means to which source fluid is initially directed, and to by-pass that fluid to the other displacement varying means to actuate it first, and to subsequently release the fluid lock to re-direct fluid to the displacement varying means to which the source fluid was initially directed.

6. In a hydrostatic power transmission system which includes a driven positive and variable displacement fluid pump, and a positive and variable displacement fluid driven motor communicatively connected to receive and be driven by the fluid output of said pump, a control system for sequentially varying the respective displacements of the pump and motor comprising:
   a reciprocating piston type pump servo cylinder operably connected to vary pump displacement between zero and maximum displacement, the piston dividing the cylinder into a working chamber and a return chamber, pressure fluid introduced into the working chamber causing movement of the piston in a direction to increase pump displacement, and when introduced into the return chamber causing piston movement in a direction to decrease pump displacement;
   a similar reciprocating piston type motor servo cylinder operably connected to vary motor displacement between maximum and a predetermined minimum displacement, the piston dividing its cylinder into a working chamber and a fluid lock chamber, pressure fluid introduced into the working chamber causing movement of the piston in a direction to decrease motor displacement, and when introduced into the fluid lock chamber causing piston movement in a direction to increase pump displacement;
   a first conduit connecting the working chambers of the respective pump and motor servo cylinders;
   a second conduit connecting the return and fluid lock chambers of the respective pump and motor cylinders;
   a source of fluid under pressure;
   means for selectively introducing fluid from the source into the motor cylinder working chamber and the pump cylinder return chamber, and for conducting used fluid therefrom;
   valve means interposed in said second conduit providing a temporary fluid lock in the motor cylinder lock chamber so that fluid introduced into the motor cylinder working chamber cannot initially move the motor cylinder piston but flows through said first conduit into the pump cylinder working chamber and forces the pump cylinder piston to move in a direction to increase pump displacement, said valve means being responsive to movement of the pump cylinder piston to a position of maximum pump displacement to release the fluid lock in the motor cylinder lock chamber to thereafter permit the source fluid being introduced into the motor cylinder working chamber to move its piston in a direction to decrease motor displacement.

7. The control system described in claim 6 in which the valve means interposed in said second conduit is a spring pressed normally closed poppet valve mounted within and reciprocable longitudinally with respect to one end of the pump servo cylinder, said poppet having an elongated stem which projects into the cylinder and is disposed in the path of travel of the pump cylinder piston as it approaches and reaches a position of maximum pump displacement, under which condition the piston contacts and lifts the valve off its seat, the elongated valve stem having an elongated generally conical fluid metering portion which coacts with the valve seat to meter a gradually increasing volume of fluid through the seat as the valve is opened, and which meters a gradually decreasing volume of fluid through the valve seat as the valve is closing.

8. The control system described in claim 6, and valve means interposed in said first conduit effective when the motor cylinder piston has moved away from a position of maximum motor displacement to provide a fluid lock in the pump cylinder working chamber so that fluid introduced from the source into the pump cylinder return chamber cannot initially move the pump cylinder piston in a direction to decrease pump displacement but flows through said second conduit into the motor cylinder lock chamber and forces the motor cylinder piston to move to a position of maximum motor displacement, said valve means being responsive to movement of the pump cylinder piston into such a position to release the fluid lock in the pump cylinder working chamber to thereafter permit the source fluid being introduced into the pump cylinder return chamber to move the pump cylinder piston in a direction to decrease pump displacement.

9. The control system described in claim 8 in which the valve means interposed in said first conduit is a spring pressed normally closed poppet valve mounted within and reciprocable with respect to one end of the motor servo cylinder, said poppet having an elongated stem which projects into the cylinder and is disposed in the path of travel of the motor cylinder piston as it approaches and reaches a position of maximum pump displacement, under which condition the piston contacts and lifts the valve off its seat, the elongated valve stem having an elongated generally conical fluid metering portion which coacts with the valve seat to meter a gradually increasing volume of fluid through the seat as the valve is opened, and which meters a gradually decreasing volume of fluid through the valve seat as the valve is closing.

10. The control system described in claim 6, and spring means urging the motor servo cylinder piston in a direction to increase motor displacement; and spring means urging the pump servo cylinder piston in a direction to decrease pump displacement.

11. In a hydrostatic power transmission system which includes a driven positive and variable displacement fluid pump, and a positive and variable displacement fluid driven motor communicatively connected to receive and be driven by the fluid output of said pump, a control system for sequentially varying the respective displacement of the pump and motor comprising:

a motor servo-cylinder including a reciprocable piston, the piston dividing the cylinder into a working chamber and a fluid lock chamber, said motor servo being connected to decrease and increase the motor displacement in response to movement of its piston under the influence of fluid pressure introduced into its working chamber and fluid lock chamber, respectively;

a pump servo-cylinder including a reciprocable piston which divides the cylinder into a working chamber and a return chamber, said pump servo being connected to increase and decrease the displacement of the pump in response to movement of its piston under the influence of fluid pressure introduced into its working chamber and return chamber, respectively;

a source of fluid under pressure;

a fluid flow control valve having an inlet port connected to said source, a motor port connected to the working chamber of the motor servo, and a motor port connected to the return chamber of the pump servo, each of said motor ports serving as a return port during the time the other port serves as a supply port;

a first conduit connecting the working chambers of the two servo-cylinders;

a second conduit connecting the return and fluid lock chambers of the respective pump and motor servos;

a first normally closed motor servo associated poppet valve interposed in said first conduit, which valve, when open, affords flow of fluid from the motor servo working chamber through said first conduit to the pump servo working chamber, and which, when closed, blocks reverse flow between those chambers, said first valve being positioned to be contacted and opened when the motor servo piston moves to a position providing maximum motor displacement, and to be closed as the motor servo piston moves away from such position;

a second normally closed pump servo associated poppet valve interposed in said second conduit which valve, when open, affords flow of fluid from the pump servo return chamber to the motor servo fluid lock chamber, and which, when closed, blocks reverse flow between those chambers, said second poppet valve being positioned to be contacted and opened when the pump servo piston moves to a position to provide maximum pump displacement, and to be closed when the pump servo piston moves away from such position;

whereby, regardless of the relative positions of the respective pistons of the motor and pump servos, when the control valve directs source fluid into the pump servo return chamber, and fluid is first by-passed through said second poppet and second conduit and moves the motor servo piston to a position providing maximum motor displacement, simultaneously opening said first poppet valve and releasing the fluid lock against movement of the pump servo piston, and the fluid being introduced into the pump servo return chamber then moves the pump servo piston to a position providing zero pump displacement, stopping operation of the motor;

and subsequently, with the pump servo piston in zero pump displacement position, and the motor servo piston in maximum motor displacement position, when the control valve directs pressure fluid into the motor servo working chamber the second poppet provides a fluid lock against initial movement of the motor servo piston, and the fluid is by-passed through the first poppet and first conduit to the pump servo working chamber and moves the pump servo piston to a position providing maximum pump displacement, in which position the pump servo piston opens the second poppet releasing the fluid lock against the motor servo piston, and the fluid being directed into the motor servo working chamber then moves the motor servo piston toward a position to provide a predetermined minimum motor displacement, simultaneously permitting said first poppet to close and provide a fluid lock in the pump servo working chamber to hold the pump servo piston in a position providing maximum pump displacement.

12. The control system described in claim 11, and spring means urging the motor servo piston toward a position providing maximum motor displacement; and spring means urging the pump servo piston toward a position providing zero pump displacement.

13. The control system described in claim 12, in which said control valve includes a means for selectively providing free communication between the two motor ports, resulting in open fluid communication between the pump servo return chamber and the motor servo working chamber, thus affording free movement of the respective pump and motor servo pistons under the influence of said spring means.

References Cited by the Examiner

UNITED STATES PATENTS 3,107,490 10/1963 Cooper et al. _____ 60—53
3,126,707 3/1964 Hann et al. _____ 60—53

EDGAR W. GEOGHEGAN, *Primary Examiner.*